United States Patent [19]

Williams et al.

[11] Patent Number: 4,735,462
[45] Date of Patent: Apr. 5, 1988

[54] INERTIA VALVES

[75] Inventors: Leonard M. Williams, Dorridge; Anthony J. Russell, Warwick; Maurice J. Wimbush, Leamington Spa, all of England

[73] Assignee: Automotive Products plc, Leamington Spa Warwickshire, England

[21] Appl. No.: 930,247

[22] Filed: Nov. 13, 1986

[30] Foreign Application Priority Data

Nov. 13, 1985 [GB] United Kingdom ............... 8527973

[51] Int. Cl.⁴ .................................................. B60T 8/28
[52] U.S. Cl. ............................. 303/24 A; 303/24 R; 303/6 C; 251/359
[58] Field of Search ............... 251/159, 170, 172, 338, 251/357, 360, 362, 363, 365; 303/6 C, 24 A

[56] References Cited

U.S. PATENT DOCUMENTS

| | | | |
|---|---|---|---|
| 4,261,623 | 4/1981 | Mizusawa | 303/24 A X |
| 4,279,447 | 7/1981 | Mizusawa | 303/24 A X |
| 4,390,213 | 6/1983 | Berisch | 303/24 A |
| 4,630,870 | 12/1986 | Kaub | 303/24 A |

*Primary Examiner*—Duane A. Reger
*Attorney, Agent, or Firm*—Solon B. Kemon

[57] ABSTRACT

An inertia valve includes a valve member which is free to move axially in a cylindrical bore and a valve seat which may be closed by the valve member is provided at one end of the cylindrical bore, said valve seat being supported on a support member so that it surrounds a port defined by the support member, the seat being spaced from the support member at its inner periphery so that it provides a flexible inner peripheral portion which may be deformed by the valve member.

5 Claims, 1 Drawing Sheet

INERTIA VALVES

BACKGROUND TO THE INVENTION

The present invention relates to inertia valves.

In one form of inertia valve, a ball or valve member is arranged to move against a biassing force and into engagement with a valve seat, under the influence of an inertial load.

SUMMARY OF THE INVENTION

According to one aspect of this invention, an inertia valve comprises; a housing having an inlet and outlet with a passage therebetween, said passage including a cylindrical chamber; a valve member located within said chamber and free to move from one end thereof to the other; a support member at one end of the chamber defining a port between the inlet and outlet and a valve seat supported on said support member so that it surrounds said port, said seat being separated axially from the valve member when the valve member abuts the other end of the chamber and being closed by the valve member when the valve member abuts the seat; the inner peripheral portion of said valve seat surrounding the port being spaced axially away from the support member so that it provides a flexible inner peripheral portion which when engaged by the valve member will be deformed to conform with the opposed surface of the valve member and form a fluid tight seal therebetween.

In operation the valve member will be biassed away from the seat and will move into engagement with the seat under a predetermined inertial load. This may be achieved by installing the valve so that the axis of the chamber is inclined to the horizontal and the valve member will be biassed away from the seat under the influence of gravity. Alternatively, spring means may apply the necessary biassing to the valve member.

BRIEF DESCRIPTION OF THE DRAWINGS

An embodiment of the invention is now described, by way of example only, with reference to the accompanying drawings, in which.

DESCRIPTION OF A PREFERRED EMBODIMENT

Figure 1:
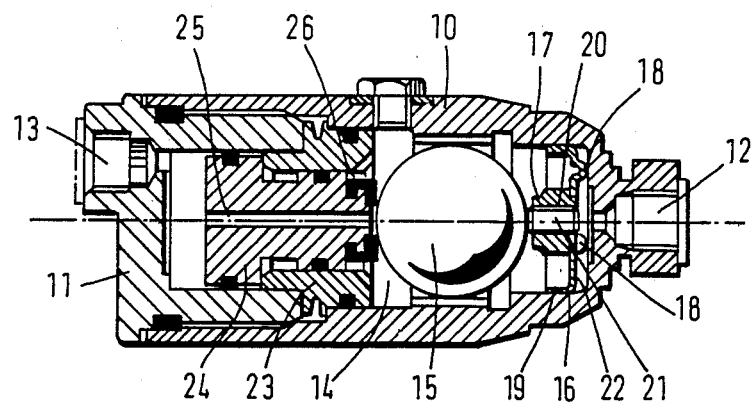
FIG. 1 shows a sectional elevation of an inertia valve formed in accordance with the present invention.

The inertia valve illustrated in the accompanying drawing is an apportioning valve for use in a motor vehicle braking system to control the balance of braking between front and rear brakes, in response to the deceleration of the vehicle. The valve comprises a two-part housing 10, 11 with screw-threaded interconnection. The housing 10, 11 defines a cylindrical bore 14 with inlet 12 at one end and outlet 13 at the other. A ball 15 is located in the cylindrical bore 14 adjacent the inlet 12, said ball 15 being a loose fit within the cylindrical bore 14 so as to permit fluid entering the housing through inlet 12 to pass to the outlet 13. A baffle plate 16 having a central boss 17 is positioned within the cylindrical bore 14 adjacent the inlet 12. The baffle plate 16 has three collapsible dimples 18 which abut the end face of the housing 10. An adjusting screw 21 engages in a screw-threaded bore 20 in boss 17, and emerges from the end of the bore 20 adjacent ball 15 and forms an abutment for ball 15. The baffle plate 16 is provided with an axially extending flange 19 around its periphery which engages the cylindrical wall of the bore 14, and a hole 22 is provided through the baffle plate 16 so that fluid may flow from inlet 12 past the baffle plate 16 into the cylindrical bore 14.

A sleeve portion 23 is positioned within the cylindrical bore 14 on the outlet side of the ball 15. A piston 24 is slidingly located within the sleeve 23, said piston having a larger diameter end adjacent the outlet 13. The piston 24 is provided with an axial bore 25 and serves as a support member for a valve seat 26, the valve seat 26 supporting the axial bore 25 at the end of piston 24 adjacent to ball 15. A small clearance is provided between the ball 15 and the valve seat 26 when the ball 15 abuts the adjusting screw 21 on baffle plate 16 and the piston 24 is at its limit of movement toward the inlet 12.

Figure 2:
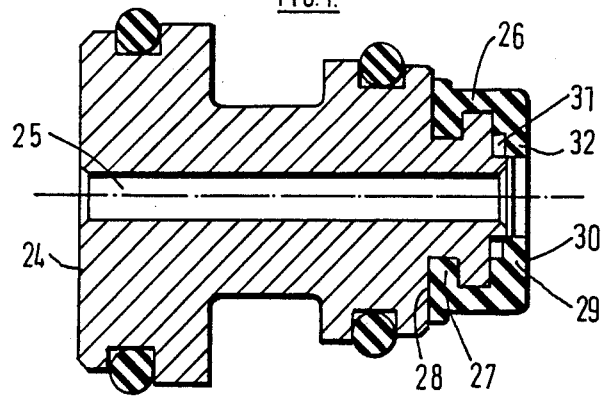
FIG. 2 shows an enlarged view of the piston/seat assembly used in the valve illustrated in FIG. 1.

As illustrated in greater detail in FIG. 2, the valve seat 26 is an elastomeric ring having an inwardly directed flange portion 27 at one end, which engages in a corresponding groove 28 in the piston 24. A second inwardly directed flange 29 is provided at the other end of the ring, this flange 29 overlying the end of piston 24, so that it surrounds the bore 25 and provides a sealing face 30 against which the ball 15 will seat to close the bore 25.

A recess 31 is provided on the inner periphery of the flange 29, on the side thereof adjacent to piston 24, so as to provide a clearance between the inner peripheral portion 32 of flange 29 and the piston 24. By this means the portion 32 of the seat 26 will be permitted to flex upon engagement with the ball 15 under relatively low loads, so that it conforms with the surface of the ball 15 increasing the area of contact and consequently the seal therebetween. The flexing of the inner peripheral portion 32 in this manner will provide a good concentricity tolerance between ball 15 and valve seat 26. Furthermore the flexibility of portion 32 will reduce any tendency for the ball 15 to rebound away from the seat 26.

When a braking force is applied the inertial load will force ball 15 up the cylindrical bore 14 towards the valve seat 26, against the force of gravity. Once a predetermined inertial load has been reached the ball 15 will engage valve seat 26 thus cutting off the bore 25 and preventing further flow of fluid from inlet to outlet. The pressure exerted at the outlet 13 which is connected to the rear brakes, will thus be maintained constant until further pressure applied to the inlet overcomes the area differential of piston 24, when the ball 15 and piston 24 will be forced towards outlet 13, thus increasing the load applied to the fluid at outlet 13 and to the rear brakes. This continues until the ball 15 engages the end of sleeve 23 when the seal against valve seat 26 will be broken and fluid will again be permitted to pass straight through from inlet 12 to outlet 13. As the pressure on ball 15 increases the inner peripheral portion 32 of the seat 26 will be further deformed until the ball 15 makes metal to metal contact with the end of the piston 24 and becomes engaged with the periphery of bore 25. In this position the ball 15 will be positively centered with respect to the bore 15, the inner peripheral portion 32 of seat 26 being wedged between the end of the piston 24 and the ball 15 to maintain the seal therebetween.

In order that the valve described above will operate under the required inertial load, the gap between the ball 15 and seat 26 must be controlled accurately. During assembly of the valve, the baffle plate 16 will be pressed into the end of the cylindrical bore 14 adjacent the inlet 12, the dimples 18 being partially compressed against the adjacent wall of the housing to provide approximate adjustment of the gap, when gauged, for example, against one of the shoulders of portion 10 of the housing. Final adjustment of the gap may be achieved after completion of the assembly, by means of adjusting screw 21, access to which may be achieved through inlet 12.

Figure 3:
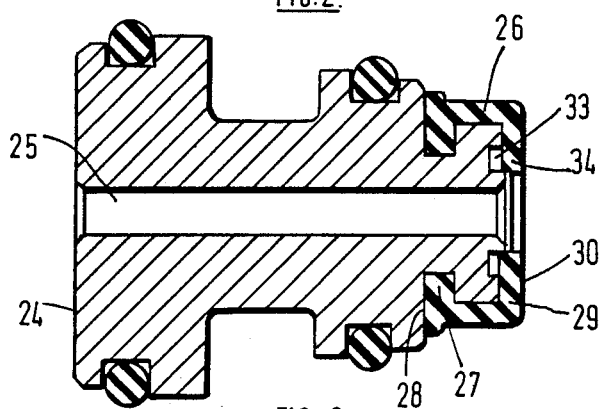
FIG. 3 shows a view similar to FIG. 2 of a modified piston/seat assembly.

In the modified piston/valve seat assembly illustrated in FIG. 3, the flange 29 is sufficiently thin to give the required degree of flex. A recess 33 is provided in the end of the piston 24, underlying the inner periphery 34 of the flange 29 so as to permit it to flex away from the ball 15.

We claim:

1. An inertia valve comprising a housing having an inlet and outlet with a passage therebetween, said passage including a cylindrical chamber; a valve member located within said chamber and free to move from one end thereof to the other; a support member at one end of the chamber defining a port between the inlet and outlet and a valve seat supported on said support member so that it surrounds said port, said seat being separated axially from the valve member when the valve member abuts the other end of the chamber and being closed by the valve member when the valve member abuts the seat; the inner peripheral portion of said valve seat surrounding the port being spaced axially away from the support member so that it provides a flexible inner peripheral portion which when engaged by the valve member will be deformed to conform with the opposed surface of the valve member and form a fluid tight seal therebetween.

2. An inertia valve according to claim 1 in which the support member defines an end wall to the cylindrical chamber and the valve seat comprises an annular member which is supported against said end wall, the inner periphery of said annular member surrounding the port, said annular member defining a sealing surface against which the valve member will seat to close the port, a recess being provided around the inner periphery of the annular member in the face of the annular member remote from the sealing surface, in order to provide the flexible inner peripheral portion.

3. An inertia valve according to claim 1 in which the support member defines an end wall of the cylindrical chamber and the valve seat comprises an annular member which is supported against said end wall, the inner periphery of said annular member surrounding the port, an annular recess being provided in the support member underlying the inner peripheral portion of the annular member to permit flexing of the portion towards the support member, when engaged by the valve member, while the remainder of the annular member is supported by the support member.

4. An inertia valve according to claim 1 in which the valve seat is mounted on the end of a piston slidable in the valve housing said piston being provided with a central bore which is surrounded by the inner peripheral portion of the valve seat.

5. An inertia valve according to claim 4 in which the seat is formed by a ring having an inwardly directed flange at one end which engages in a corresponding groove in the piston and an inwardly directed flange at the other end which overlies the end of the piston and provides the sealing surface of the seat.

* * * * *